United States Patent [19]

Wirth, Sr.

[11] 3,843,033
[45] Oct. 22, 1974

[54] TIRE AND WHEEL CARRIER

[76] Inventor: Robert A. Wirth, Sr., 905 - 13th Ave., Nebraska City, Nebr. 68410

[22] Filed: June 12, 1973

[21] Appl. No.: 369,269

[52] U.S. Cl. .............................................. 224/42.24
[51] Int. Cl. .............................................. B62d 43/08
[58] Field of Search ..................... 224/42.24, 42.25; 248/361 R

[56] References Cited
UNITED STATES PATENTS

| 2,772,826 | 12/1956 | Krengel | 224/42.24 |
| 2,797,036 | 6/1957 | Geiger | 224/42.24 |
| 3,482,749 | 12/1969 | Cooper | 224/42.24 X |

FOREIGN PATENTS OR APPLICATIONS

| 1,011,782 | 6/1952 | France | 224/42.24 |

Primary Examiner—Robert G. Sheridan
Assistant Examiner—Jerold M. Forsberg
Attorney, Agent, or Firm—Henderson & Strom

[57] ABSTRACT

A tire and wheel carrier for a pick-up truck which is mountable in the rack. The carrier having a base element mounted to the floor of the rack, a pair of spaced upright rods secured to the base element which are vertically adjustable relative to the base element, a top element secured to the rods and securable to the overhanging flange of the sidewall of the rack, and a holding unit adjustably secured to the rods for securing the wheel and tire.

6 Claims, 6 Drawing Figures

PATENTED OCT 22 1974　　3,843,033

TIRE AND WHEEL CARRIER

BACKGROUND OF THE INVENTION

Pick-up trucks normally do not provide a carrier for a spare tire and wheel in the rack. The owner of a truck has the option of permitting the tire and wheel to ride in the rack wherein it is subject to damage, as the truck is in motion over rough roads, due to the bouncing and sliding back and forth, or to theft. A number of tire and wheel carriers have been developed, however they are costly and usually designed to fit only one model of one manufacturer of a pick-up truck. Furthermore, they generally only provide a holding device for the wheel and tire and do not provide locking elements to prevent theft.

The major problem however is the lack of universalness of available carriers. Many different models must be stocked by the distributor, wholesaler, and retailer to properly cover every model of truck. The buyer is unable to transfer the carrier from truck to truck and may even have to wait weeks after acquiring a pick-up truck before he can safely carry his spare tire, because his supplier did not stock a particular size of carrier.

Druar, U.S. Pat. No. 1,492,288, discloses a carrier which is attachable to a rigid member, and has a bolt and a locking lug for securing a wheel to the carrier, however a cap must be utilized to coact with the locking lug which has to be slid over the locking lug before a wheel can be secured thereto. In addition, that carrier is designed to suspend the wheel in the air and thus requires an extremely heavy rigid support member.

Other designed carriers either suspend the wheel or provide a plate on which the tire rests. However, with the exception of Druar which suspends the tire outside of the rack, none of the known carriers are universal, nor can they be adjusted for different size tires.

SUMMARY OF THE INVENTION

This invention relates to a universally mountable wheel and tire carrier for carrying a tire and wheel in the rack of a pick-up truck, which prevents damage thereto or theft. The carrier includes a base element securable to the floor of the rack, rod elements secured to the base element which are vertically adjustable thereto, a top element secured to the rods and securable to the rack, and a holding unit which is movably secured to the rods and firmly holds the tire and wheel.

An object of this invention is to provide a carrier for securely carrying a tire and/or a wheel in the rack of a pick-up truck.

Another object of the invention is the provision of a carrier which can secure a tire and wheel in a pick-up truck in a locked condition.

A further object of this invention is to provide a tire and wheel carrier which is adapted to fit any size rack of a pick-up truck, and which can hold any size tire which has been provided for that truck.

Yet another object of this invention is the provision of a tire and wheel carrier which is extremely effective in use; compact, rugged, and simple of construction; and economical of manufacture.

These objects and other features and advantages of this invention will become more readily apparent upon reference to the following description when taken in conjunction with the accompanying drawings.

DESCRIPTION OF THE PREFERRED EMBODIMENT

Figure 1:
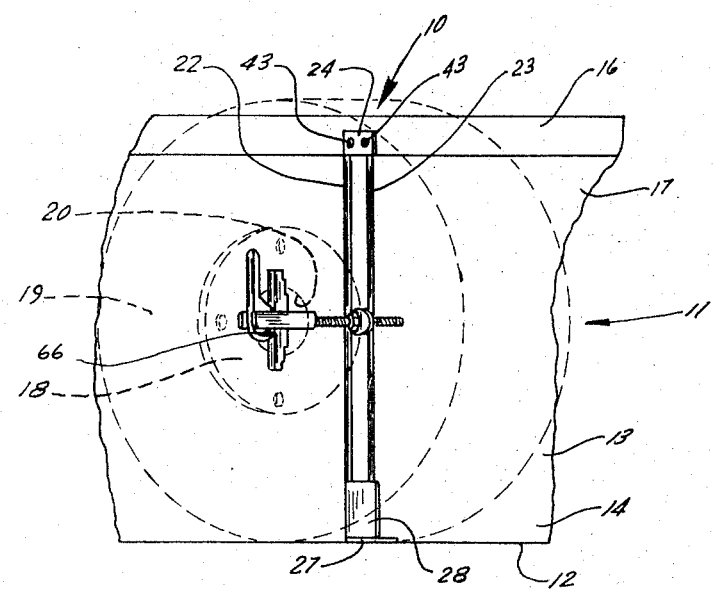
FIG. 1 is a perspective view of the tire and wheel carrier of this invention with a tire and wheel in broken line, mounted thereon.

Referring now to the drawings, the carrier of this invention is generally shown at 10 in FIG. 1 as it would be mounted in the rack 11 of a pick-up truck (not shown). The rack includes a floor 12, a sidewall 13 secured at its lower end 14 to the floor, and an inwardly projecting flange 16 secured to the upper end 17 of the sidewall 13. Detachably secured to the carrier 10 is a wheel 18 having a tire 19 mounted thereon. An opening 20 is formed in a conventional manner, axially of the wheel 18 to permit it to be mounted over the hub (not shown) of an axle (not shown) of the truck.

The carrier 10 (FIGS. 2 and 4) includes a base element 21, a pair of parallel upstanding rods 22 and 23 adjustably mounted to the base element 21, a top element 24 secured to and projecting upwardly of the rods 22 and 23, and a tire and wheel holding unit 26 movably secured to the rods 22 and 23 and projecting outwardly thereof.

Figure 2:
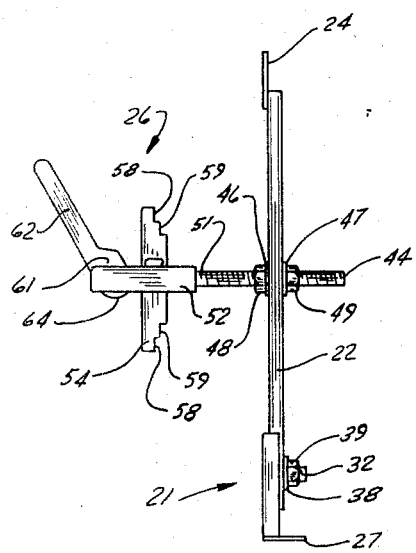
FIG. 2 is a side elevational view thereof.
Figure 4:
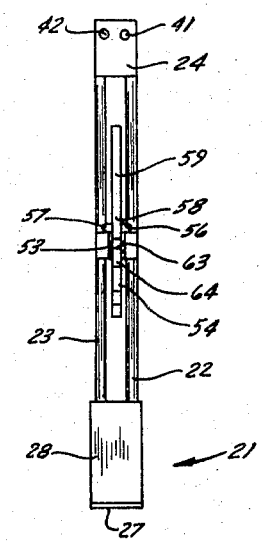
FIG. 4 is a front elevational view thereof.
Figure 5:
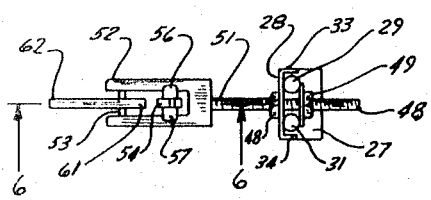
FIG. 5 is a top plan view thereof.

Referring now to FIGS. 2, 4 and 5, the base element 21 is depicted as including a horizontally disposed base plate 27 and a channel shaped upright 28 integrally secured or welded to the plate 27. A pair of spaced holes 29 and 31 are formed in the plate 27 for the purpose of receiving bolts (not shown) or the like for securing the plate 27 to the floor 12. A threaded member 32 is secured on one end thereof to the upright 28, between the sidewalls 33 and 34 thereof, and projects rearwardly over the plate 27.

Figure 3:
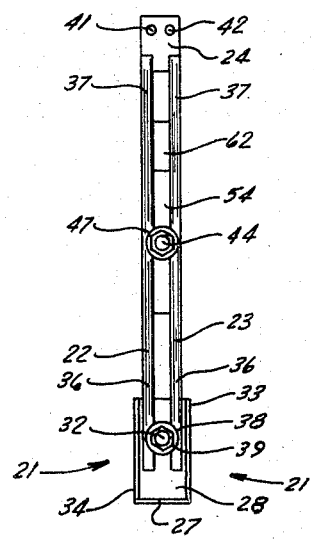
FIG. 3 is a rear elevational view thereof.

Disposed on each side of the member 32 (FIG. 3) is one end 36 of the rods 22 and 23. Secured to the upper ends 37 of each rod is the top element 24, thus providing a spacing member for maintaining the rods in a spaced apart relation and for securing the carrier to the flange 16. A washer 38 and a nut 39 hold the lower ends of the rods to the base element 21 and permit the top element 24 to be spaced at variable predetermined distances from the base element 21. A pair of spaced openings 41 and 42 are drilled through the top element 24 and permit it to be secured to the flange 16 by metal screws 43, or the like (FIG. 1).

Figure 6:
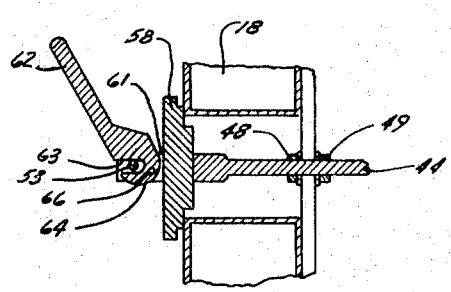
FIG. 6 is a fragmentary sectional view taken along the lines 6—6 in FIG. 5.

Slidably secured between the rods 22 and 23 at approximately their midpoints is the tire and wheel holding unit 26 (FIGS. 2, 5 and 6). The holding unit 26 includes a threaded shaft 44. Mounted on the shaft 44 on each side of the rods 22 and 23 is a washer 46 and 47 and a nut 48 and 49. Secured to the distal end 51 of the shaft 44 is a bifurcated arm 52. A pin 53 is disposed between the two elements of the arm 52. Removably mounted between the two elements of the arm is a vertically disposed offset bar 54 having a pair of opposed bosses 56 and 57. Each boss 56 and 57 projects outwardly of the sides of the bar and permit the bar to ride on the two elements of the arm 52, with the lower portion of the bar depending from the arm and the upper portion projecting upwardly of the arm 52. A plurality of aligned cut out notches 58 and 59 are formed in the bar (FIG. 2) wherein the area between the notches is adapted to seat against the wheel opening 20. A cam shaped lever 61 having a handle 62 secured thereto and a slot 63 formed radially upwardly from the cam face 62 is pivotally mounted on the pin 53. A lock receiving opening 66 is formed through the lever 61 and permits the lever to be locked in an upright position thus preventing the theft or loss of the wheel and tire from the carrier.

In use, the nut 39 (FIG. 2) is loosened and the top element 24 and the base plate 27 are secured to the flange 16 and the floor 12 respectively of the pick-up truck (FIG. 1). The nut 39 is then tightened thus securely fastening the carrier 10 to the rack 11. It will thus be noted that the height of the flange 16 from the floor can be of any distance and the carrier can still be secured thereto because of the expandable feature provided by the slidable mounting of the rods to the base element 21. The wheel and tire are then slid over the shaft 44 and the shaft is positioned vertically to permit it to extend axially of the wheel 18 with the tire supported by the floor 12. The shaft is then threaded into or outwardly of the nuts 48 and 49 to permit the bar 58 to be mounted in the arm 52 between the pin 53 and the wheel 18. The cam lever 61 is then mounted on the pin 53 and the handle 62 grasped and rotated about the pin 53. Rotation of the handle 62 in a counterclockwise direction tightly seats the bar against the wheel and tire and the wheel and tire against the rods 22 and 23. In the event the tire and wheel are not tightly seated the shaft 44 is threaded into the nuts 48 and 49 thus bringing the arm closer to the rods. To lock the wheel and tire to the carrier a lock (not shown) is mounted in the hole 66 of the cam lever 61.

I claim:

1. A carrier for mounting a wheel having an axial opening therethrough and a tire mounted thereon which carrier is mounted in the rack of a pick-up truck having a sidewall and a floor, the carrier comprising:

base means securable to the floor;

upright means adjustably secured at one end to said base means and having a horizontally disposed slot formed therethrough;

a top element secured to said upright means other end and securable to the sidewall;

a shaft adjustably secured to said upright means and having a free end projecting outwardly therefrom, said shaft having a threaded end disposed through said slot and a pair of nuts threadably mounted on said threaded end with said nuts disposed on opposite sides of said upright means for securing said shaft thereto;

a bifurcated arm secured to said shaft free end and projecting outwardly therefrom and having a pair of bifurcations;

a pin interconnecting said bifurcations;

an offset bar removably mounted between said bifurcations and having a pair of opposed bosses projecting outwardly thereof thus permitting said offset bar to be positioned between said bifurcations with each boss disposed on one of said bifurcations; and a cam lever pivotally mounted on said pin and coactable with said offset bar;

wherein one side of the wheel and tire are mountable against said upright means with said shaft projecting through the axial opening in the wheel and said offset bar being disposed against the other side of the wheel thus securely holding the tire and wheel to said upright means when rotation of said cam lever causes said offset bar to move toward said shaft threaded end.

2. A tire and wheel carrier as defined in claim 1 wherein said offset bar has a plurality of aligned notches formed therein thus permitting said offset bar to seat against the wheel.

3. A tire and wheel carrier as defined in claim 2 wherein said upright means includes a pair of spaced rods with the area between said rods forming said slot.

4. A tire and wheel carrier as defined in claim 3 wherein said base means includes a base plate and a channel shaped upright secured to said plate, said plate having a pair of spaced holes formed therethrough for receiving bolts for securing said plate to the floor, said upright having an opening formed therethrough for receiving a bolt which coacts with said rods wherein said rods are vertically adjustable relative to said upright, and said upright channel providing a guide to maintain said rods in a vertical attitude.

5. A tire and wheel carrier as defined in claim 4 wherein said holding means includes a lock and said cam lever has an opening formed therethrough for receiving said lock.

6. A tire and wheel carrier as defined in claim 5 wherein said cam lever has a slot formed radially therein thus permitting the removal of said cam lever from said pin.

* * * * *